May 1, 1962 P. H. GLEICHAUF 3,032,608
COLOR TUBE POTENTIAL SWITCHING BETWEEN COLOR AND MONOCHROME REPRODUCTION
Filed Nov. 15, 1956
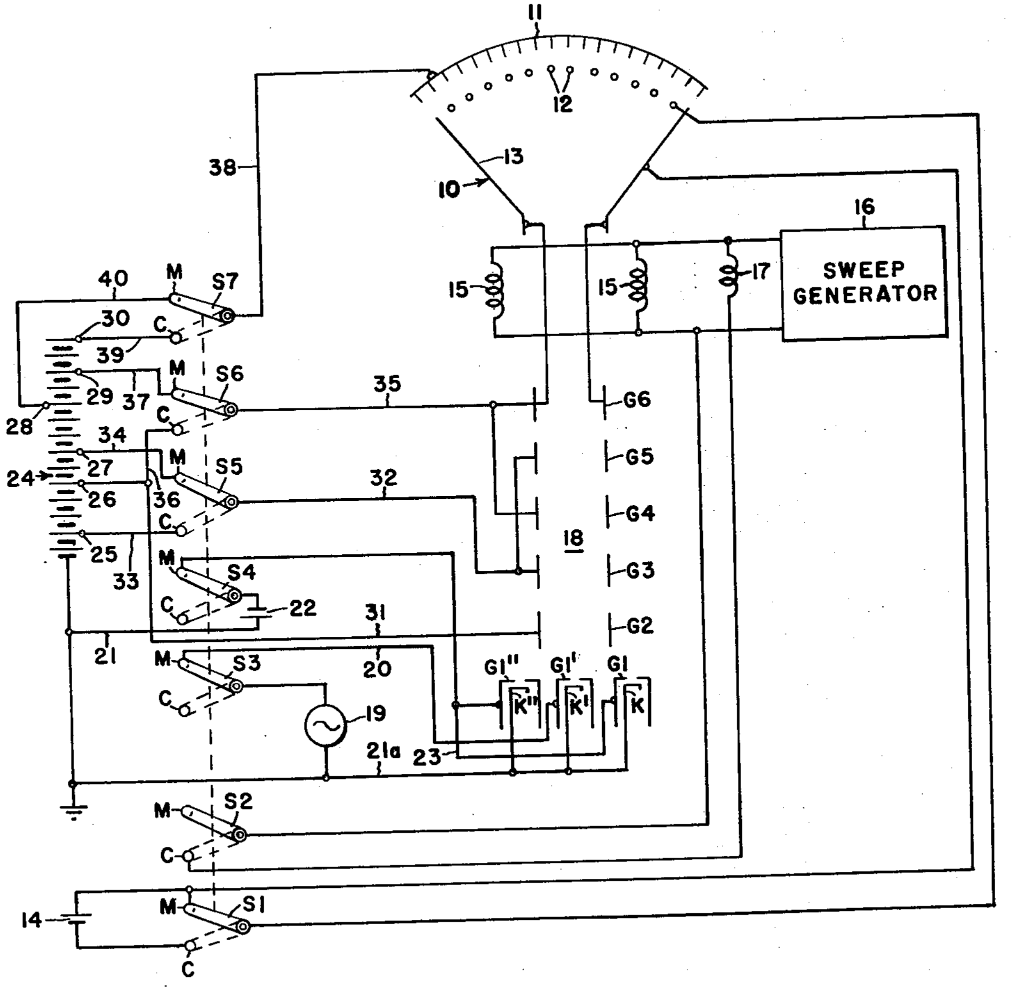
INVENTOR:
PAUL H. GLEICHAUF,
BY Robert J. Steinmeyer
HIS ATTORNEY.

3,032,608

COLOR TUBE POTENTIAL SWITCHING BETWEEN COLOR AND MONOCHROME REPRODUCTION

Paul H. Gleichauf, Syracuse, N.Y., assignor to General Electric Company, a corporation of New York Filed Nov. 15, 1956, Ser. No. 622,393
6 Claims. (Cl. 178—5.4)

This invention relates to a method and means for selectively producing either a monochrome or a color picture on a color television picture tube. More particularly, the invention relates to a method and means for improving the resolution of a monochrome picture produced on a color television picture tube by using post-deceleration of an electron beam from a single electron gun operated at a relatively high potential.

The present invention may be applied to any type of television picture tube which has one or more electron guns and which includes a grille, a mask, or any other apertured electrode such as is commonly used, for example in the post-acceleration type of color television cathode ray tube. Such a tube is, for example, described in a French patent to Fernseh A.G. No. 866,065, issued March 31, 1941. The post-acceleration type of tube, in general, comprises an evacuated envelope closed at its front end by a faceplate on the inside surface of which is a phosphor screen backed by a conductive coating and having three primary color emitting phosphors arranged in a pattern such that each elemental area of picture element size contains a three color phosphor triad. This particular tube also includes three closely spaced electron guns arranged side by side and axially positioned in a plane perpendicular to the faceplate in such a fashion that electrons emitted from the guns in response to applied video signals may be caused to impinge on or illuminate the screen. A deflection yoke provides angular deflection of the electron beams from the guns sufficient to sweep the screen both horizontally and vertically in a picture raster pattern. Spaced from, and in substantially parallel relationship with the screen, is an electron permeable or apertured electrode, such as grille of wires, which functions as a lens for the electron beams from the guns. This electrode is normally maintained at or close to the potential of the final anodes of the electron guns, whereas the screen is maintained at a substantially higher potential so that there is an accelerating field between the apertured electrode and the screen when a color picture is being displayed. The apertures of the electrode are so spaced and positioned with respect to the center of deflection of each scanning electron beam that the beam from each gun illuminates only the one prosphor of the triad which emits the particular primary color for which the individual beam is intended.

It has been conventional practice to obtain a monochrome picture on such tri-gun post-acceleration picture tubes by applying the same monochrome video signal, modified by the efficiency of the respective phosphor, to all three of the guns of the tube. This method of operation frequently results in discoloration of the monochrome picture. This discoloration may be either or both of the types commonly known in the art as "fringe discoloration" or "color impurity." Furthermore, this method of operation does not provide wholly satisfactory resolution even in the absence of discoloration. The problem is aggravated by the fact that a monochrome picture requires a higher degree of resolution than does a color picture in order to compensate for the absence of the additional chromaticity information contained in the color signal. Moreover, these shortcomings in the quality of the monochrome picture produced on a color receiver are particularly apparent to an observer who is accustomed to the present high standards of monochrome reception in black and white receivers.

It is therefore an object of this invention to provide a method and means for operating and controlling a color television picture tube to produce a monochrome picture in such fashion as to overcome the above noted difficulties.

It is a more specific object of this invention to provide a television picture tube and associated circuitry therefor which is adapted to produce post-acceleration of a plurality of electron beams to display a color picture and to produce post-deceleration of a single electron beam to display a monochrome picture.

Briefly, in accordance with one aspect of the invention, a cathode ray tube is provided with a screen, a grille or any other apertured electrode, and one or more electron guns. The tube is further provided with any conventional means to display a color picture in response to color video signals, and with switching circuits to vary the potentials applied to its various electrodes when a monochrome picture is to be displayed. These switching circuits are such that monochrome video signal is applied to only one electron gun operated at a relatively high potential. The electron beam from this gun is decelerated by an electric field established between the screen and the grille or apertured electrode. The high gun potential results in a relatively small spot size, and the post-deceleration of electrons results in slight defocusing of the electron beam sufficient to prevent the grille or apertured electrode from casting a shadow which would lead to discoloration or rainbow effects as a result of unequal excitation of the phosphor elements of each triad. Additionally, even with the post-deceleration of the single electron beam, a better resolution is found to be obtainable with a single high energy beam than can be achieved by the use of three electron beams which are not perfectly convergent.

While the novel and distinct features of the invention are particularly pointed out in the appended claims, a more expository treatment of the invention, in principle and in detail, together with additional objects and advantages thereof, is afforded by the following description and accompanying drawing of a representative embodiment in which the single figure of the drawing is a schematic circuit diagram of the invention as applied to a multi-gun cathode ray color television picture tube.

Turning now to the drawing, there is shown a schematic circuit diagram of a cathode ray color television picture tube 10 which may, for example, be of the conventional post-acceleration type discussed above. It should be understood, however, that tube 10 may also be of the shadow mask type, the type disclosed in U.S. Patent No. 2,711,493 to Lawrence, or of any other type which includes an apertured electrode or electron lens adjacent to a phosphor screen. The particular tube illustrated by way of example only includes a multichrome phosphor screen 11 which consists of an end faceplate having a plurality of cathode luminescent phosphors backed by a conductive coating deposited on the inner surface of the faceplate. Three separate phosphors, each emitting a different primary color, may conveniently be arranged in horizontal or vertical strips or in any mosaic pattern such that each picture element area contains a triad including each of the three different phosphors. In one particular tube, to be described in detail below by way of example only, the vertical stripe type of pattern is used. Spaced from, and in generally parallel relationship with the screen 11 is in electron lens consisting of an apertured electrode 12 which may, for example, consist of a grille work of wires or of an apertured mask. In the above noted exemplary embodiment, electrode 12 consists of a grille of parallel wires having a diameter of 0.003 inch, the centers of which were spaced 0.0357 inch from each other and 0.780 inch from sceen 11.

Tube 10 may further include a conductive cone portion 13 and a neck portion surrounding which is a deflection yoke 15. When color pictures are to be displayed, the potential of cone 13 conveniently may be made positive with respect to electrode 12 by a battery or other voltage source 14 in order that cone 13 may collect scattered or secondarily emitted electrons. Voltage source 14 may, for example, be of the order of 300 volts. It is connected between electrode 12 and cone 13 through a single pole double throw switch S1 when the arm of this swtich is thrown to the dashed line position connecting it with terminal C for reception of color signals. When the arm of switch S1 is connected to terminal M, as shown in solid lines in the drawing, voltage source 14 is open circuited whereas electrode 12 and cone 13 are directly connected to each other. Electrode 12 and cone 13 may thus be operated at the same potential for reception of monochrome signals. Although it is possible to leave battery 14 in the circuit for the reception of both color and monochrome signals and thus eliminate switch S1, the present invention also makes it possible to short out battery 14 during reception of monochrome signals which is often desirable for reasons which will become apparent from the discussion below.

The deflection yoke 15 which surrounds the neck of tube 10 may have power supplied to it from any conventional sweep generator 16. Yoke 15 serves to deflect the electron beam or beams in a conventional picture raster pattern. An impedance such as inductor 17 is selectively connected in shunt across the output of generator 16 through the arm of a single pole double throw switch S2. Impedance 17 is connected in shunt with sweep generator 16 when the arm of switch S2 is thrown to the dashed line position connecting it with terminal C for reception of color signals, and is open circuited when the arm of switch S2 is thrown to terminal M for the reception of monochrome signals. Impedance 17 may equivalently be replaced by any convenient means for decreasing the power delivered to the deflection yoke during reception of color signals or for increasing the power delivered to the yoke during reception of monochrome signals when a higher voltage or "stiffer" beam is used.

Of course it will be understood that switches S1 and S2, as well as switches S3, S4, S5, S6, and S7, to be described below, are in fact mechanically "ganged" and are so connected in the circuit that each of the switch arms has one position for reception of color signals and another position for reception of monochrome signals. The terminals corresponding to these two positions are in each case respectively labeled C and M. Each of these switches may be of any conventional type suitable for handling the voltages applied thereto.

Mounted in the neck of tube 10 at the end remote from screen 11 is a gun 18 which is shown by way of example as having three electron emitting cathodes, K, K' and K''. Associated with each of these cathodes is a control grid G1, G1' and G1'' respectively. Also associated with each cathode is a set of electron accelerating and focusing electrodes. In the drawing only one such set of electrodes, G2, G3, G4, G5 and G6, has been shown schematically since only one of the cathodes and associated set of electrodes are used for monochrome reception in accordance with the present invention. In practice it is possible to have either a separate set of accelerating and focusing electrodes for each cathode or a single set of electrodes for the entire gun assembly. In the particular exemplary tube noted above, a three beam periodic focusing type of gun having a separate set of electrodes for each cathode is used. The distance from grille 12 to the final anode G6 of this gun is 16.882 inches and the distance from grille 12 to the plane of deflection of the three electron beams is 13.719 inches.

A source of monochrome video signal 19 is connected between ground and the arm of a switch S3. Terminal M of the switch S3 is connected by a conductor 20 to the control grid of one of the guns of the tube 10. This connection is shown by way of example only as being made to control grid G1'. Terminal C of switch S3 is shown open circuited. It will of course be understood that during reception of a color picture, color video signals may be supplied by switch controlled means to all of the control grids through conventional circuitry not shown in the drawing.

The positive terminal of a battery or voltage source 22 is connected to ground by a conductor 21. Each of the indirectly heated cathodes K, K' and K'' is also connected to ground by conductor **21*a*. The negative terminal of battery 22 is connected to the arm of switch S4, the terminal C of which is open circuited for the same reason given in connection with terminal C of switch S3. Terminal M of switch S4, however, is connected by a conductor 23** to all of the control grids to which monochrome signal is not to be applied. The negative potential thus applied to all of the control grids except that to which monochrome video signal is applied prevents the escape of electrons from any but the one intended preselected gun cathode during monochrome reception.

Operating potentials for tube 10 and gun 18 thereof are derived from a power supply 24 which is here schematically indicated as a tapped battery. It will of course be understood that in practice any conventional regulated power supply and voltage divider may be used. Battery or power supply 24 is shown provided with taps 25, 26, 27, 28, 29, and 30. As noted above, any convenient voltage divider connected across the output of a conventional power supply will afford an equivalent arrangement. In the particular illustrative embodiment of the invention described in detail above, the potential differences between the grounded cathodes and the respective taps of the power supply are as follows:

Tap 25, 3.2 kv.
Tap 26, 7 kv.
Tap 27, 10 kv.
Tap 28, 16 kv.
Tap 29, 20 kv.
Tap 30, 25.5 kv.

Accelerating electrode G2 of gun 18 is connected by a conductor 31 to tap 26 of power supply 24. Electrode G2 is therefore operated at the same potential, which may for example be 7 kv., for either color or monochrome reception. Focusing electrodes G3 and G5 of gun 18 are connected together and are further connected by a conductor 32 to the arm of a switch S5. Terminal C of switch S5 is connected by a conductor 33 to tap 25 which may for example be at 3.2 kv., and terminal M of switch S5 is connected by a conductor 34 to tap 27 which, for example, may be at 10 kv. It will thus be seen that the focusing electrodes are operated at a lower potential with respect to the grounded cathodes for reception of a color signal than they are for reception of a monochrome signal. Accelerating electrodes G4 and G6 of gun 18 are connected to each other and are further connected to cone 13 of the tube 10. Electrodes G4, G6, and cone 13 are connected by a conductor 35 to the arm of switch S6. Terminal C of switch S6 is connected by a conductor 36 to tap 26 which may, for example, be at 7 kv. Terminal M of switch S6 is connected by a conductor 37 to tap 29 which may, for example, be at 20 kv. It is thus seen that the final anode or electrode G6 of guns 18 may be operated at a substantially higher potential with respect to the cathode of the gun when a monochrome picture is being received than when a color picture is being received. This increases in the operating potential of the final anode of the gun results in a decrease in the size of the spot to which the electron beam is focused and is one of the factors which contributes to the improved resolution obtainable by the present invention in the display of monochrome pictures.

Screen 11 is connected by a conductor 38 to the arm of switch S7. Terminal C of switch S7 is connected by a conductor 39 to tap 30 which may, for example, be at 25.5 kv. whereas terminal M of switch S7 is connected by a conductor 40 to tap 28 which may, for example, be at 16 kv. As noted above, all of the switches S1 through S7 are mechanically ganged so that they are each thrown simultaneously to the appropriate one of their two positions in accordance with whether the video signal to be received represents a color or a monochrome picture. Each of the switches may be of any conventional type suitable for handling the voltages involved and the means for ganging the switches may likewise be any conventional device suitable for the particular receiver in which the circuit is to be used.

Turning now to the operation of the circuit, and using the above noted exemplary values for purposes of discussion, it will be noted that when a color signal is to be received, the screen 11 is at a potential of 25.5 kv., grille 12 is at a potential of 6.7 kv., and cone 13 as well as gun electrode G6 and G4 are at a potential of 7 kv. The potential difference of 18.8 kv. between screen 11 and grille 12 creates an electron accelerating electric field therebetween, and the tube operates as a conventional post-acceleration color picture tube in a manner well known in the art. Briefly, the three electron beams from gun 18 are controlled in direction by deflection yoke 15 and pass through a substantially field-free region between the final anode or electrode G6 of gun 18 and grille 12 before passing into the accelerating field between grille 12 and screen 11. Each of the three beams is thus directed to the particular one of the three phosphor elements which it is intended to excite. The slight potential difference between grille 12 and cone 13 established by voltage source 14 creates sufficient field between the grille and the cone so that secondarily emitted or scattered electrons will be collected by cone 13.

On the other hand, in accordance with the present invention, when a monochrome picture is to be displayed all of the switches are thrown from the terminals marked C to the terminals marked M. As noted above, video signal is thus applied to only a preselected one of the guns and a single electron beam is thereby obtained. Of course it should be understood that, although the invention is illustrated as applied to a three gun color tube, the same principles may be applied to tubes using any number of guns for color reception. For example, if a single gun color tube is to be used, one need merely apply the monochrome signal to a single gun of the tube. In any type of color tube, however, it is necessary that the single electron beam modulated by the monochrome video signal strike all three phosphors of the triad of phosphors in each picture element area in order to produce a black and white picture. In the exemplary post-acceleration type of tube discussed in detail above it has been found that this cannot be achieved simply by connecting the grille and the screen to the same potential for monochrome reception. If the grille and the screen are at the same potential, a slight shadow effect occurs from the grille wires and a rainbow type discoloration pattern is observed instead of a uniformly white raster. To obtain equal excitation of all three phosphors by bombardment with electrons from a single beam in accordance with the invention, post-deceleration is employed in order to enlarge the beam sufficiently to prevent the grille from casting a shadow. This is achieved by the electron lens action of the decelerating field created between electrode 12 and screen 11.

It will be noted that when the switches are on the M terminals, screen 11 is connected to tap 28 which, in the exemplary embodiment taken for purposes of discussion, is at 16 kv. Grille 12 is directly connected through switch S1 to cone 13 which in turn is connected to electrode or final anode G6 of gun 18; these electrodes as well as accelerating electrode G4 are in turn connected to tap 29 which is at 20 kv. Thus, the grille or apertured electrode 12 is operated at a potential equal to that of the final anode of the gun and also equal to approximately 5/4 of the potential of the screen, where all potentials are specified relative to the grounded cathode of the gun. The stated relationship by which the screen potential is about 80% of the grille potential has been found to be an optimum for the specific tube discussed above as a specific example. In general, however, the most desirable value for this ratio will depend upon the detailed construction of the particular tube used. In any case, it is necessary that the direction of the electric field existing between the screen and the grille during monochrome reception be the reverse or opposite of that which exists when a color picture is displayed on the post-acceleration tube. The direction of the field during monochrome reception is such as to decelerate the electron beam and consequently spread, enlarge, or defocus it sufficiently so that all three phosphors of each triad are uniformly excited by the beam. That is to say, regardless of the angle at which the single electron beam passes through the apertures of electrode 12, grille or electrode 12 will not cast a shadow since the beams passing through adjacent apertures are enlarged sufficiently to overlap each other.

When changing from color to monochrome operation it is preferred to simultaneously decrease the potential of the screen and increase the potential of the grille or apertured electrode in order to produce the above noted decelerating field since it is desirable to operate the final anode of the gun at grille potential. In practice the simultaneous change of both screen and grille potential results in a grille potential and hence a final anode potential of desired increased value. It will, of course, be understood, however, that it is the relationship between the potentials of the screen and the grille which determines the direction of the resulting electric field rather than their absolute values. It is apparent that in general, in changing from color to monochrome reception, this same relationship may be obtained either by holding the screen at a fixed potential and simply increasing the potential of the grille or apertured electrode or, alternatively, by holding the grille potential fixed and further reducing the potential of the screen. Of course, the latter procedure has the disadvantage of decreasing the brightness obtainable. The most desirable manner of obtaining a decelerating field in any particular embodiment, however, depends upon the construction and overall operating potential requirements of the particular picture tube being used.

It should be noted that focusing electrodes G3 and G5 of gun 18 in the illustrative exemplary embodiment are changed from 3.2 kv. for color reception to 10 kv. for single beam monochrome operation in conformity with the change from 7 kv. to 20 kv. of final anode G6. Electrode G2 is operated at 7 kv. for both color and monochrome reception. Thus, the drive conditions on the gun remain unchanged until the resolution is substantially increased by the smaller spot size of the high energy beam resulting from the increased potential of the gun's final anode G6. In order to accommodate the stiffer beam resulting from the increased final anode potential during monochrome reception, increased deflection power is supplied to the deflection yoke in the manner described above.

It should be further noted that for single beam monochrome reception electrode 12 and cone 13 may be operated at the same potential since the higher potential of electrode or grille 12 relative to screen 11 prevents the secondary elcetrons emitted from grille 12 from reaching the screen. Also, scattered and secondary electrons produced at the screen are drawn to grille 12. Therefore, there is no loss of contrast in the picture because of secondary or scattered electrons. Of course as noted above, battery 14 may if desired be left in the circuit even during monochrome reception since it will have substantially no effect on the overall operation of the circuit. Furthermore it has been found there are no difficulties with discoloration in the frange areas such as is frequently observed in color tubes when displaying monochrome pictures by the use of three guns. Additionally, both "fringe discoloration" resulting essentially from a lack of convergence of three beams and the "color impurities" resulting from unequal phosphor excitation are substantially eliminated by the present invention. Finally, as noted above, convergence problems naturally do not exist when a single electron beam is used and the improved resolution obtainable from the use of a higher gun potential is consequently still further enhanced.

While the principles of the invention have now been made clear in an illustrative embodiment, there will be immediately apparent to those skilled in the art many modifications in structure, arrangement, proportions and the components used in the practice of the invention, and otherwise, which are particularly adapted for specific environments and operating requirements, without departing from those principles. The appended claims are, therefore, intended to cover and embrace any such modifications within the limits only of the true spirit and scope of the invention.

What I claim as new and desire to secure by Letters Patent of the United States is:

1. In a color television picture tube of the type having a plurality of electron beam emitting guns, a multichrome phosphor screen having the phosphors thereof arranged in color groups, and an apertured electrode positioned between said guns and said screen in proximity to and electrically insulated from said screen, means to apply a first set of potentials to said guns, said apertured electrode and said screen to adapt said tube for the production of color pictures on said screen by electrons emitted in response to color video signals applied to all of the guns of said tube, the improvement comprising means to apply a monochrome video signal to a single gun of said tube to produce a single modulated electron beam, means to focus said beams, means to deflect said beam in a picture raster pattern, means to change the potentials applied to said apertured electrode relative to said screen to produce a decelerating field between said apertured electrode and said screen, and defocusing means including said apertured electrode for causing said electron beam to uniformly excite all phosphors of each said color group to produce a monochrome picture on said screen.

2. In a multi-gun post-acceleration color television picture tube of the type having a plurality of electron beam emitting guns, a multichrome phosphor screen having the phosphors thereof arranged in color groups, an apertured electrode positioned between said guns and said screen and in proximity to said screen, said electrode being adapted to be operated at a lower potential than said screen to produce an electron accelerating field therebetween for the production of color pictures on said screen by electrons emitted in response to video signals applied to all of said guns, the improvement comprising means to apply a monochrome video signal to only a preselected one of said guns to produce a single modulated electron beam, means to focus said beam, means to deflect said beam in a picture raster pattern, means to reverse the direction of the field between said screen and said apertured electrode to decelerate the electrons of said beam, and defocusing means including said apertured electrode for causing said electron beam to uniformly excite all phosphors of each said color group to produce a monochrome picture on said screen.

3. In a color television picture tube of the type having a plurality of electron beam emitting guns, a multichrome phosphor screen having the phosphors thereof arranged in color groups, and an apertured electrode positioned between said guns and said screen in proximity to and electrically insulated from said screen, means to apply a first set of potentials to said guns, said apertured electrode and said screen to adapt said tube for the production of color pictures on said screen by electrons emitted in response to color video signals applied to all of the guns of said tube, said potentials including a first final anode gun potential, the improvement comprising means to apply a potential higher than said first potential to the final anode of a single gun of said tube to produce a single electron beam, means to apply a monochrome video signal to modulate the intensity of said beam, means to focus said beam, means to deflect said beam in a picture raster pattern, means to change the potentials applied to said apertured electrode relative to said screen including means to maintain said apertured electrode at substantially the potential of said first final anode of said gun to produce a decelerating field between said apertured electrode and said screen, and defocusing means including said apertured electrode for causing said electron beam to uniformly excite all phosphors of each said color group to produce a monochrome picture on said screen.

4. In a multi-gun post-acceleration color television picture tube of the type having a plurality of electron beam emitting guns, a multichrome phosphor screen having the phosphors arranged in color groups, and an apertured electrode positioned between said guns and said screen and in proximity to said screen, said electrode being adapted to be operated at a lower potential with respect to ground than said screen to produce an electron accelerating field therebetween for the production of color pictures on said screen by electron beams emitted from said guns at a first final anode gun potential with respect to ground and modulated by color video signals applied to all of said guns, the improvement comprising means to apply a potential with respect to ground higher than said first potential to the final anode of only a preselected one of said guns to produce a single electron beam and to accelerate said beam toward said screen, means to modulate said single electron beam by a monochrome video signal, means to focus said beam, means to deflect said beam in a picture raster pattern, defocusing means including said apertured electrode energized to produce a decelerating field between said apertured electrode and said screen for causing said electron beam to uniformly excite all phosphors of each said color group to produce a monochrome picture on said screen.

5. In combination, a cathode ray tube having multichrome-phosphor screen, at least one electron beam producing gun having at least a cathode, a control grid and a final accelerating anode, means to deflect said electron beam, and an apertured electrode positioned between said screen and said gun, means to selectively apply either a color video signal or a monochrome video signal between the control grid and the cathode of said gun, means to apply a first voltage between the final anode and the cathode of said gun when color signal is applied to its grid, and means to apply a second voltage which is larger than said first voltage between the final anode and the cathode of said gun when monochrome signal is applied to said grid; means to increase the deflection force applied to said beam when monochrome signal is applied to said grid; means to apply a third voltage to said apertured electrode and a fourth voltage to said screen when color signal is applied to said grid, said third voltage being less than said fourth voltage with respect to said cathode; means to apply a fifth voltage to said apertured electrode and a sixth voltage to said screen when monochrome signal is applied to said grid, said fifth voltage being greater than said sixth voltage with respect to said cathode.

6. Apparatus as in claim 5 wherein said sixth voltage has a value which is approximately eighty percent of the value of said fifth voltage, and wherein said fifth voltage is substantially equal to said second voltage.

References Cited in the file of this patent

UNITED STATES PATENTS

| | | |
|---|---|---|
| 2,728,024 | Ramberg | Dec. 20, 1955 |
| 2,784,342 | Overbeek | Mar. 5, 1957 |
| 2,848,530 | Schmalz | Apr. 19, 1958 |
| 2,866,127 | Allwine | Dec. 23, 1958 |

OTHER REFERENCES

RCA Color Television Receiver, Model CT–100, March 1954, pages 31 to 34.

Fink, "Television Engineering Handbook"; McGraw-Hill Book Co., 1957; pages 2–13 (TK 6642 F5).